(12) United States Patent
Ruff et al.

(10) Patent No.: US 8,504,621 B2
(45) Date of Patent: Aug. 6, 2013

(54) FACILITATING A DECISION-MAKING PROCESS

(75) Inventors: Joseph Ruff, Mountain View, CA (US); Robert P. Starling, Mountain View, CA (US); Michael D. Trinkala, Sunnyvale, CA (US); Karen M. Cross, Mountain View, CA (US); Brandon W. Porter, Auburn, WA (US); Gary Clayton, Daly City, CA (US)

(73) Assignee: Microsoft Corporation, Redmond, WA (US)

( * ) Notice: Subject to any disclaimer, the term of this patent is extended or adjusted under 35 U.S.C. 154(b) by 1239 days.

(21) Appl. No.: 11/925,702

(22) Filed: Oct. 26, 2007

(65) Prior Publication Data

US 2009/0112782 A1    Apr. 30, 2009

(51) Int. Cl.
    *G06F 15/16*    (2006.01)

(52) U.S. Cl.
    USPC ............................................ 709/206

(58) Field of Classification Search
    USPC ............................ 709/206; 707/705
    See application file for complete search history.

(56) References Cited

U.S. PATENT DOCUMENTS

| | | | | |
|---|---|---|---|---|
| 5,717,865 | A * | 2/1998 | Stratmann | 705/7.29 |
| 5,995,951 | A * | 11/1999 | Ferguson | 706/10 |
| 6,195,643 | B1 * | 2/2001 | Maxwell | 705/7.32 |
| 6,304,861 | B1 * | 10/2001 | Ferguson | 706/10 |
| 6,484,196 | B1 * | 11/2002 | Maurille | 709/206 |
| 6,826,552 | B1 * | 11/2004 | Grosser et al. | 706/47 |
| 6,993,327 | B2 * | 1/2006 | Mathis | 455/414.1 |
| 7,096,188 | B1 | 8/2006 | Schlick et al. | |
| 7,130,836 | B2 * | 10/2006 | Grosser et al. | 706/47 |
| 7,200,638 | B2 * | 4/2007 | Lake | 709/206 |
| 7,234,117 | B2 * | 6/2007 | Zaner et al. | 715/758 |
| 7,454,469 | B2 * | 11/2008 | Zhou et al. | 709/206 |
| 7,461,059 | B2 * | 12/2008 | Richardson et al. | 1/1 |
| 7,475,027 | B2 * | 1/2009 | Brand | 705/7.29 |
| 7,580,710 | B2 * | 8/2009 | Katz et al. | 455/445 |
| 7,603,413 | B1 * | 10/2009 | Herold et al. | 709/204 |
| 7,620,902 | B2 * | 11/2009 | Manion et al. | 715/758 |
| 7,676,034 | B1 * | 3/2010 | Wu et al. | 379/265.01 |
| 7,689,432 | B2 * | 3/2010 | Gross | 705/14.73 |
| 7,702,728 | B2 * | 4/2010 | Zaner et al. | 709/205 |
| 7,761,345 | B1 * | 7/2010 | Martin et al. | 705/26.1 |
| 7,818,320 | B2 * | 10/2010 | Makeev | 707/730 |
| 7,836,001 | B2 * | 11/2010 | Ducheneaut et al. | 706/45 |
| 7,882,056 | B2 * | 2/2011 | Begole et al. | 706/54 |
| 7,890,581 | B2 * | 2/2011 | Rao et al. | 709/204 |

(Continued)

OTHER PUBLICATIONS

Yoshino, T., et al. NAMBA: location-aware collaboration system for shopping and meeting, Aug. 2002, IEEE Transactions on Consumer Electronics, vol. 48, Issue: 3, pp. 470-477.*

(Continued)

*Primary Examiner* — Alicia Baturay
(74) *Attorney, Agent, or Firm* — Perkins Coie LLP

(57) ABSTRACT

Systems and methods for facilitating a decision-making process are disclosed. In one aspect of the present disclosure, in response to receiving a request to facilitate a decision making process, the decision-making agent participates in a communications thread where users are attempting to reach a decision regarding a business to frequent and/or an activity to partake. Since group activities are oftentimes scheduled via common communication threads, the decision-making agent can intervene in such communication threads, when requested, and assist the participating users in making a decision or making informed suggestions toward reaching an agreement.

19 Claims, 10 Drawing Sheets

U.S. PATENT DOCUMENTS

| | | | |
|---|---|---|---|
| 7,904,530 B2 * | 3/2011 | Partridge et al. | 709/217 |
| 7,917,154 B2 * | 3/2011 | Fortescue et al. | 455/456.1 |
| 7,984,006 B2 * | 7/2011 | Price | 706/46 |
| 8,000,726 B2 * | 8/2011 | Altman et al. | 455/456.3 |
| 8,019,692 B2 * | 9/2011 | Rosen | 705/319 |
| 8,108,414 B2 * | 1/2012 | Stackpole | 707/758 |
| 8,108,501 B2 * | 1/2012 | Birnie et al. | 709/223 |
| 8,150,844 B2 * | 4/2012 | Redstone et al. | 707/724 |
| 2003/0100315 A1 * | 5/2003 | Rankin | 455/456 |
| 2003/0153375 A1 | 8/2003 | Vancura | |
| 2004/0054638 A1 | 3/2004 | Agami et al. | |
| 2004/0083153 A1 | 4/2004 | Larsen et al. | |
| 2005/0060377 A1 * | 3/2005 | Lo et al. | 709/206 |
| 2005/0091118 A1 * | 4/2005 | Fano | 705/26 |
| 2005/0239529 A1 | 10/2005 | Moshal | |
| 2006/0047825 A1 * | 3/2006 | Steenstra et al. | 709/229 |
| 2006/0179053 A1 * | 8/2006 | von Ahn Arellano et al. | 707/6 |
| 2006/0200333 A1 | 9/2006 | Dalal et al. | |
| 2006/0224399 A1 | 10/2006 | Alkemper et al. | |
| 2006/0234631 A1 * | 10/2006 | Dieguez | 455/41.2 |
| 2006/0266830 A1 * | 11/2006 | Horozov et al. | 235/386 |
| 2006/0281496 A1 | 12/2006 | Cedraeus | |
| 2007/0027730 A1 | 2/2007 | McArdle | |
| 2007/0061128 A1 | 3/2007 | Odom et al. | |
| 2007/0117571 A1 * | 5/2007 | Musial | 455/456.1 |
| 2007/0171029 A1 * | 7/2007 | Inbarajan | 340/425.5 |
| 2007/0271367 A1 * | 11/2007 | Yardeni et al. | 709/223 |
| 2008/0155031 A1 * | 6/2008 | Fortier et al. | 709/206 |
| 2008/0307053 A1 * | 12/2008 | Mitnick et al. | 709/205 |
| 2009/0005981 A1 * | 1/2009 | Forstall et al. | 701/211 |
| 2009/0073033 A1 * | 3/2009 | Price | 342/357.07 |
| 2009/0144271 A1 * | 6/2009 | Richardson et al. | 707/5 |
| 2009/0187467 A1 * | 7/2009 | Fang et al. | 705/10 |
| 2009/0319616 A1 * | 12/2009 | Lewis et al. | 709/206 |
| 2010/0070581 A1 * | 3/2010 | Hewes et al. | 709/206 |
| 2011/0125678 A1 * | 5/2011 | Partridge | 706/12 |
| 2011/0137927 A1 * | 6/2011 | Partridge et al. | 707/767 |
| 2012/0185481 A1 * | 7/2012 | Bjork et al. | 707/737 |

OTHER PUBLICATIONS

Chown, Eric, et al., "An Architecture for Emotional Decision-Making Agents," AAMAS '02, Jul. 15-19, 2002, Bologna, Italy, 2 pages.

Howard, S., "Trade-off Decision Making in User Interface Design," Behaviour & Information Technology, vol. 16, Issue 2, Mar. 1997, 1 page.

Kakas, Antonis and Moraitis, Pavlos, "Argumentation Based Decision Making for Autonomous Agents," AAMAS '03, Jul. 14-18, 2003, 8 pages.

Sycara, Katia and Zeng, Dajun, "Multi-Agent Integration of Information Gathering and Decision Support," ECAI 96, 12th European Conference on Artificial Intelligence, 5 pages.

* cited by examiner

FACILITATING A DECISION-MAKING PROCESS

BACKGROUND

Even with the plethora of communications means and ease of accessibility to business listings, consumers are continuously faced with difficulties in making informed decisions about the places of businesses to frequent. When consumers are partaking upon a group event, making informed decisions and reaching a consensus among the group of people can be particularly challenging. For example, there may be a deficiency of sources where information could be conveniently obtained in regards to the business listings. Even with access to a number of options, a group of consumers sometimes cannot make a decision due to a willingness to kowtow to the strongest personality in the group, which may cause dissension and dissatisfaction in the group.

In addition, obtaining basic information, such as hours/days of operation, location, menu, as well as extensive business information, such as consumer ratings, professional ratings of food, service, and/or atmosphere, of the potential places of business to frequent, could be time consuming and labor intensive for a group of people engaged in a discussion about where to go or what to do. For example, if a consumer is in a chat session with friends via a web-based chat service, the consumer may need to utilize a third-party web-browser to obtain additional information about business listings by opening another window and going outside the current communication thread to obtain the desired information.

However, if the discussion is carried on over a cellular phone or a wireless text-based service (e.g., SMS, MMS, USSD), the users may not readily have access to information on business listings over the web. In order to obtain detailed business listing information, the consumers may need to call 411 to obtain the phone number of the business of interest and directly contact the business. This typically requires that the consumers know the places of business available for them to choose from, which is often times not the case, especially for tourists and individuals whom are out of town for business.

SUMMARY

Systems and methods for facilitating a decision-making process are described here. Some embodiments of the present disclosure are summarized in this section.

In response to receiving a request to facilitate a decision making process, a decision-making agent may participate in a communication thread where users are attempting to reach a decision regarding a business to frequent and/or an activity in which to partake. Since group activities are oftentimes scheduled via common communication threads (e.g., multi-way conference, IM, SMS text, chat, email group, or other communication thread), the decision-making agent can intervene in such communication threads, when requested, and assist the participating users in making a decision and/or informed suggestions toward reaching an agreement.

For example, a user organizing a group dinner event can send a multi-way IM chat request to determine the venue at which to hold the event. Since different users typically have varying preferences and requirements, the process to reaching a consensus becomes exceedingly arduous, especially with an increasing number of users. Thus, the criteria of the participating users trying to come to a decision may be initially identified and processed. A list of suggestions satisfying the criteria of the users is accordingly provided to the users. For example, if two users do not wish to eat fast food and another user prefers sushi for lunch, the decision-making agent may suggest a sushi bar, salad buffet, or a steakhouse to visit for lunch.

In addition, the decision-making engine may generate a gaming environment based on the communication thread and the number of users in the decision making process. Results may be randomly generated. For example, a visualization and/or sound of a roulette wheel or dice rolling can be generated and the result of the game is announced to determine the winner. Similarly, gaming environments with user interaction, such as rock-paper-scissors, flipping a coin, can also be enabled by allowing users to select, by hitting a button and/or submitting their entries via text and/or voice, for example.

The decision-making agent may additionally provide informed suggestions based on user preferences that are explicitly stated and/or user preferences that are indicated implicitly, for example, by user search history, by user behavior, attitude, etc. In addition, the decision-making agent can have access to a set of parameters associated with a business listing, or places or events of interest that can be factored into the process of making suggestions towards reaching an agreement.

The parameters can include, but are not limited to, hours of operation, location/distance, special events (e.g., live band, happy hour), user ratings, professional ratings, etc. A user may request to only consider venues with four or more stars as rated on a community-based review system (e.g., Yelp.com, citysearch.com, etc.). In some instances, the set of parameters associated with a business can be obtained in real-time, for example via wired or wireless synchronization, or manual updates in a system (e.g., either by personnel of the business or by the decision making agent).

The decision-making agent may have access to real-time information regarding the participating users. Since many electronic devices have GPS functions, (near) real-time location data of a user is typically known. The decision-making agent can request user devices to send GPS or other location data, periodically. The agent may also get GPS data via the carrier instead of from the device, based on cell tower triangulation or other means. The user may proactively request the device to send GPS data to the decision-making agent. For example, users may request to visit a business located within 10 miles of their current location. Suggestions can thus further be made based on identified locations of users. In some embodiments, user location can be determined based on service subscription information. For example, area codes, zip codes, billing and/or mailing addresses can provide preliminary information regarding a user's approximate geographical location.

A method implementing techniques associated with this disclosure, which may be implemented on a system, may include receiving a request from at least one user of a group that wishes to facilitate a decision making process via one or more communications protocols. A set of criterion predetermined by the at least one user within which at least one suggestion towards a decision is to be made can be identified. One embodiment includes, searching for a set of search results to generate the at least one suggestion to facilitate the decision making process. The suggestions can be provided in a format that is deliverable via the one or more communications protocols to the at least one user and presented to the at least one user via the one or more communications protocols.

The present disclosure includes methods and systems which perform these methods, including processing systems which perform these methods, and computer readable media which when executed on processing systems cause the systems to perform these methods.

Other features of the present disclosure will be apparent from the accompanying drawings and from the detailed description which follows.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
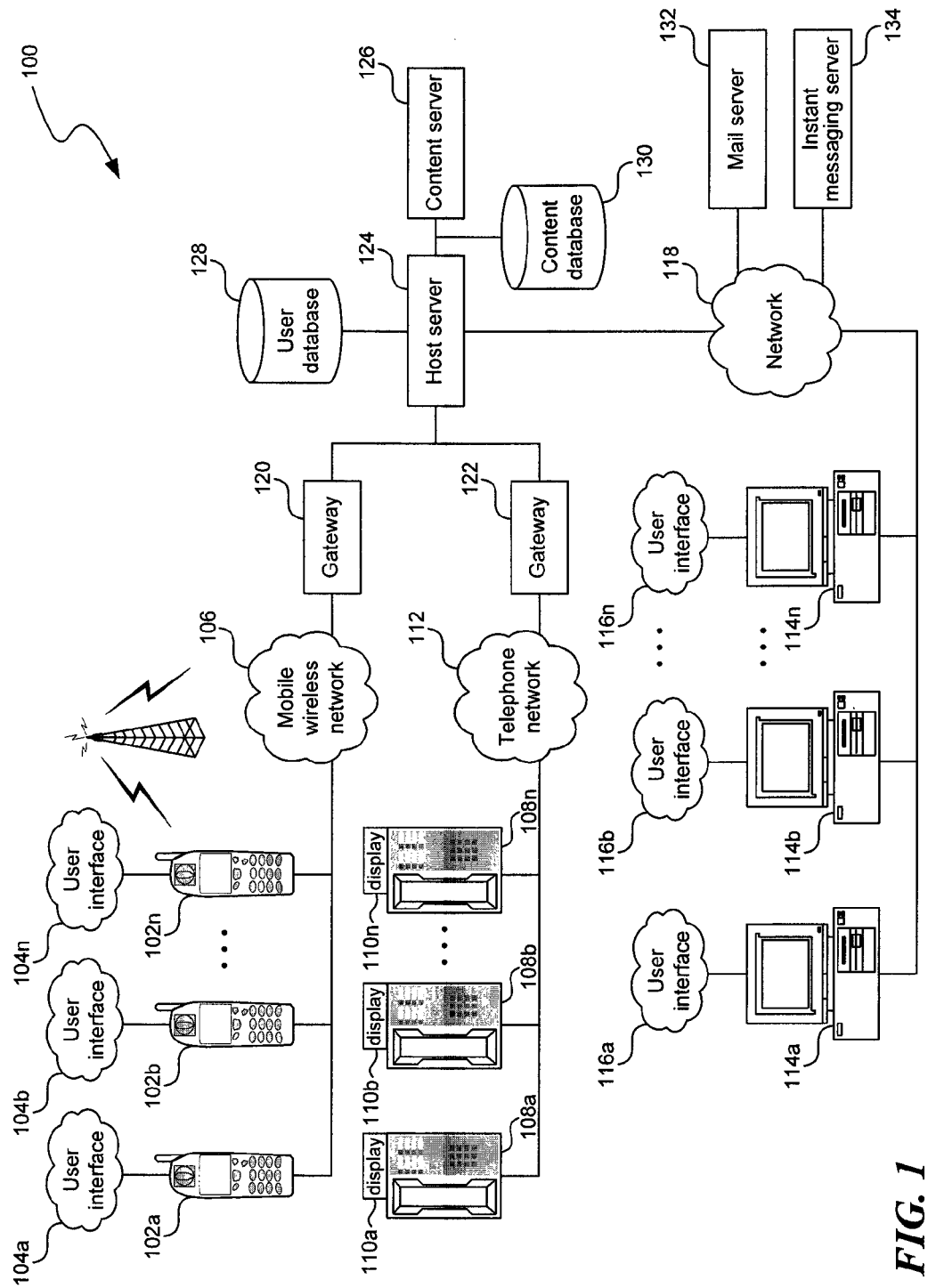
FIG. 1 illustrates a block diagram of a plurality of client devices coupled to one another and a host server that facilitates a decision-making process among users of the plurality of client devices via one or more networks.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the relevant art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

FIG. 1 illustrates a block diagram of a plurality of client devices 102A-N, 108A-N, 114A-N coupled to one another and a host server 124 that facilitates a decision-making process among users of the plurality of client devices via one or more of a mobile wireless network 106, telephone network 112, and/or network 118, according to one embodiment.

The plurality of client devices (e.g., mobile devices) 102A-N can be any system and/or device, and/or any combination of devices/systems that is able to establish a connection with a wireless network (e.g., mobile wireless network 106). The mobile devices 102A-N typically include a screen or other output display functionalities to present data exchanged between the devices to a user, such as to display user interfaces 104A-N. For example, the mobile devices 102A-N can be, but are not limited to, a mobile computing device, a mobile phone, a cellular phone, a VoIP phone, a smart phone, a PDA, a Blackberry device, a Treo, and/or an iPhone, etc.

The plurality of telephonic devices 108A-N can be any system and/or device, and/or any combination of devices/systems that is able to establish a connection with a telephone network 112. The telephonic devices 108A-N typically include a screen 110A-N or other output display functionalities to present data exchanged between the devices to a user, such as to display system or call status. The mobile devices 102A-N can be, but are not limited to, a wired or wireless telephone, a fax machine, an answering machine, mobile phone, a cellular phone, a landline phone, a satellite phone, a PBX phone, a VoIP phone, a smart phone, a PDA, a Blackberry device, a Treo, an iPhone, and/or any other type of communication device able to provide voice communication and/or touch-tone signals over the telephone network 112. In addition, any audio signal carrying interface can be used.

The client devices 114A-N can be any system and/or device, and/or any combination of devices/systems that is able to establish a wired or wireless connection with another device, servers and/or other systems in some instances via a network (e.g., network 118). The client devices 114A-N may also include a screen or other output display functionalities to present data exchanged between the devices to a user, such as, to display user interfaces 116A-N. For example, the client devices 114A-N can be, but are not limited to, a processing unit, a server desktop, a desktop computer, a computer cluster, a mobile computing device such as a notebook, a laptop computer, a handheld computer, a mobile phone, a smart phone, a PDA, a Blackberry device, a VoIP phone, a Treo, and/or an iPhone, etc.

In one embodiment, the mobile devices 102A-N, the telephonic devices 108A-N and client devices 114A-N are coupled via a mobile wireless network 106, gateways 120/122 and the network 118. The host server 124 can be coupled to the mobile devices 102, telephonic devices 108, and the client devices 114 via one or more of the mobile wireless network 106, the telephone network 112, and the network 118.

For example, the wireless network (e.g., mobile wireless network) 106 can be any network able to establish connections with mobile devices 102A-N, such as mobile phones. The wireless network 110 can be, but is not limited to Global System for Mobile Communications (GSM) network, Code Division Multiple Access (CDMA) network, Evolution-Data Optimized (EV-DO) network, Enhanced Data Rates for GSM Evolution (EDGE) network, 3GSM network, Fixed Wireless Data, 2G, 2.5G, 3G networks, enhanced data rates for GSM evolution (EDGE) network, General packet radio service (GPRS) network, enhanced GPRS network, Digital Enhanced Cordless Telecommunications (DECT), Digital AMPS (IS-136/TDMA) network, and Integrated Digital Enhanced Network (iDEN).

GSM networks typically provide wireless service providers with the ability to offer roaming services to subscribers when they travel outside of the region (e.g., country) where subscription is based. Communication services provided by the wireless network 106 may further support messaging protocols such as, but is not limited to, Multimedia Messaging Service (MMS), SMS, USSD, IRC, or any other wireless data networks and/or messaging protocols.

In particular, GSM networks typically offer Short Message Service (SMS), or text messaging services to subscribers, thus allowing, for example, mobile device users (e.g., users of mobile devices 102A-N) to send text messages to one another. SMS is typically supported by mobile standards such as ANSI CDMA networks, 3G, AMPS, satellite, and/or landline networks. The Short Message Service-Point to Point (SMS-PP) is defined in the GSM recommendation 3GPP TS 23.040/3GPP TS 23.041 and is incorporated herein by reference.

In addition to messaging between mobile device users, messages (e.g., ads, public messages) can be broadcasted to mobile devices within a geographical region. SMS messages sent from a mobile device can be forwarded to Short Message Service Centers (SMS-C) which can store and/or forward the text message to a recipient. If the recipient mobile device cannot be reached or is not available, the SMS-C can store the message in a queue to be sent later. In some instances, the SMS-C attempts transmission once and does not store unsent messages in a queue for later retry. In some situations, a user may request delivery reports to receive a confirmation when a text message has been delivered to the receiving mobile device.

Typically, the transmission of text messages between the mobile device and the SMS-C is managed by the Mobile Application Part (MAP) of the SS7 protocol. The MAP specification is described in 3GPP TS 29.002 and the contents are incorporated herein by reference. MAP allows various communications networks (e.g., GSM, UMTS mobile core networks, GPRS core networks, etc.) to interact with one another to deliver services to mobile devices. In addition to SMS, the applications facilitated by MAP include, by way of example but not limitation, mobility services for location management and authentication, operation and maintenance, call handling, supplementary services, Packet Data Protocol (PDP) services for GPRS, and/or location service management services.

The SS7 protocol is a standard described by the ITU Telecommunication Standardization Sector (ITU-T) and includes functions such as, but is not limited to, Message Transfer Part (MTP) to provide transfer an delivery of signaling information across networks, Signaling Connection Control Point (SCCP) to provide routing capabilities via SubSystem Numbers (SSNs), ISDN User Part (ISUP) to provide transport of call set-up information between signaling points, Interconnect User Part (IUP) to support customer services and network features at point of interconnect between public networks, Transaction Capability Application Part (TCAP) to provide capability of transferring non-circuit-related information between signaling points, and Telephone User Part (TUP) to provide transport of call set-up information between signaling points for voice services, etc.

In addition, GSM provides Unstructured Supplementary Service Data (USSD) capabilities to mobile devices to support transmission of information over signaling channels of the GSM network. USSD is a communications technology that can be used to send data (e.g., text) between a mobile device and an application program in the network. USSD is defined in the GSM standard in GSM 02.90 (USSD Stage 1), GSM 03.90 (USSD Stage 2), and GSM 04.90; the contents are herein incorporated by reference. USSD Phase 1 in general supports mobile-initiated operations (as opposed to network-initiated operations).

Therefore, the mobile device can send a USSD command to the network and receive a response. In other words, a USSD Phase 1 communication session typically comprises one request and one answer (e.g., one USSD transaction). With USSD Phase 2, a dialogue can generally be established between the mobile device and the wireless network. Multiple USSD operations can typically be sent within a communication session. In addition, the dialogue with USSD Phase 2 can be network (application)-initiated or mobile station-initiated.

In most instances, USSD can provide a text-based, bidirectional, interactive, and session-oriented channel of communication between mobile devices and servers in the Home Public Land Mobile Network (HPLMN) and the Visited Public Land Mobile Network (VPLMN) of mobile subscribers. USSD messaging service is typically session-based thus resulting in faster response times compared to messaging services that are store-and-forward services such as SMS. Thus typically, once a USSD command/message has been sent to a service provider, a response can be received within a few seconds. In some applications, a USSD command is sent to query available balance and/or call logs in pre-paid GSM services. The mobile device user can, in some instances, communicate with a wireless application provided by the wireless service provider (e.g., operator) in a manner that is transparent to the mobile device and intermediate network entities.

The telephone network 112, can by any network able to establish connections with one or more telephone devices 108a-N through any known and/or convenient telephonic protocol. For example, the telephone network 112 can be, but is not limited to, the public switched telephone network (PSTN), the integrated services digital network (ISDN), asymmetric digital subscriber line (ADSL), digital subscriber line (DSL) and/or some other type of telephone network. The telephone network 112 generally represents an audio signal carrying network. Telephonic devices can digitally transmit speech, sound, touch-tone signals, and/or other types of data over the telephone line. The PSTN is largely governed by technical standards created by the ITU-T, and uses E.163/E.164 addressing and is incorporated herein by reference.

The network 118, over which the client devices 114A-N communicate, may be a telephonic network, an open network, such as the Internet, or a private network, such as an intranet and/or the extranet. In addition, the network through which IM servers (e.g., IM server 134) provide services to client devices may be a telephonic network, an open network, such as the Internet, or a private network, such as an intranet and/or the extranet.

The client devices 114-N can be coupled to the network (e.g., Internet) via a dial up connection, a digital subscriber loop (DSL, ADSL), cable modem, and/or other types of connection. Thus, the client devices 114A-N can communicate with remote servers (e.g., web server, host server, mail server, instant messaging server) that provide access to visual interface to the World Wide Web via a web browser, for example.

For example, the Internet can provide file transfer, remote log in, email, news, RSS, and other services through any known and/or convenient protocol, such as, but is not limited to the TCP/IP protocol, Open System Interconnections (OSI), FTP, UPnP, iSCSI, NSF, ISDN, PDH, RS-232, SDH, SONET, etc. In some embodiments, the network 118 can be any collection of distinct networks operating wholly or partially in conjunction to provide connectivity to the client devices, host server, and/or the content providers 108A-N, 110 and may appear as one or more networks to the serviced systems and devices. In one embodiment, communications can be achieved by a secure communications protocol, such as secure sockets layer (SSL), or transport layer security (TLS).

In addition, communications can be achieved via one or more wired and/or wireless networks, such as, but is not limited to, one or more of a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), Bluetooth, Wi-Fi, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

The gateways 120 and 122, typically interfaces the mobile wireless network 106 and the telephone network 112 to another network (e.g., network 118) that utilizes one or more different protocols. The gateways 120 and 122 can communicate with one or more components having any combination of software agents and/or hardware modules for facilitating a mobile device operator (e.g., a user of mobile devices 102A-102N) and the telephone operator (e.g., a user of telephone devices 108A-N) to communicate with a client device user (e.g., a user of client devices 108A-N) through a mobile wireless network (e.g., the wireless network 106), a telephone network (e.g., the telephone network 112), and the network 118.

The gateways 120 and 122 can include a number of components such as, but is not limited to, protocol transistors, impedance matching devices, rate converters, fault isolators, and/or signal translators, etc., to interface to one or more networks with different protocols than the protocols under which the original signal was sent. The gateways 120 and 122 can further facilitate the establishment of a set of rules and administrative procedures between different network protocols such that communication can be established. Typically, protocol converters such as gateways can operate at any network layer (e.g., the application layer, the presentation layer, the session layer, the transport layer, the network layer, the data link layer, and/or the physical layer) of the Open System Interconnection (OSI) model and convert one protocol stack into another. For example, a gateway can connect a LAN to the Internet. Similarly, gateways can also connect two IP-based networks.

In some embodiments, the gateways 120 and/or 122 are any combination of hardware modules and software agents able to convert an SMS message to the TCP/IP standard. In one embodiment, connection between the SMS-C and the Internet and/or other TCP/IP-based networks can be established via the SMPP protocol provided by the gateway. The gateway may further be connected to the IM server 134 through a TCP/IP network. In one embodiment, the gateway is connected to the IM server 134 via the XMPP protocol, which is typically compatible with real-time or near-real-time communications and managing presence information of subscribers.

RFC 821 published by the Internet Engineering Task Force (IETF) describes the Simple Mail Transport Protocol (SMTP) the contents of which are herein incorporated by reference. RFC 1459 published by IETF describes the Internet Relay Chat (IRC) protocol, a system for text-based conferencing in TCP/IP networks, the contents of which are herein incorporated by reference. RFC 3920, 3921, 3922 and 3923 published by IETF describe the Extensible Messaging and Presence Protocol (XMPP), a protocol for "instant messaging" (IM) applications in TCP/IP networks, the contents of which are herein incorporated by reference.

In one embodiment, the host server 124 is coupled to a mail server 132 over the network 118. The mail server 214 includes software agents and/or hardware modules for managing and transferring emails from one system to another, such as but is not limited to Sendmail, Postfix, Microsoft Exchange Server, Eudora, Novell NetMail, and/or IMail, etc. The mail server 132 can also store email messages received via the network. In one embodiment, the mail server 132 includes a storage component, a set of access rules which may be specified by users, a list of users and contact information of the users' friends, and/or communication modules able to communicate over a network with a predetermined set of communication protocols.

The content server 126 represents any system having software agents and/or hardware modules able to provide content that is static and/or dynamic. The content server 126 can be a server provided by online radio networks, including online radio stations, Real Networks, Rhapsody, iTunes, etc. Although one content server is illustrated, many content servers may be communicatively coupled to the host server 124. For example, the content server 126 may be systems which host web-sites for business listings. The content server 126 may also be a review-based website with user ratings and comments of business listings.

The user database 128 and content database 130 can store software, descriptive data, images, system information, drivers, and/or any other data item utilized by other components of the host server 124 and/or the content server 126 for operation. The user database 128 and content database 130 may be managed by a database management system (DBMS), for example but not limited to, Oracle, DB2, Microsoft Access, Microsoft SQL Server, PostgreSQL, MySQL, FileMaker, etc.

Figure 3A:
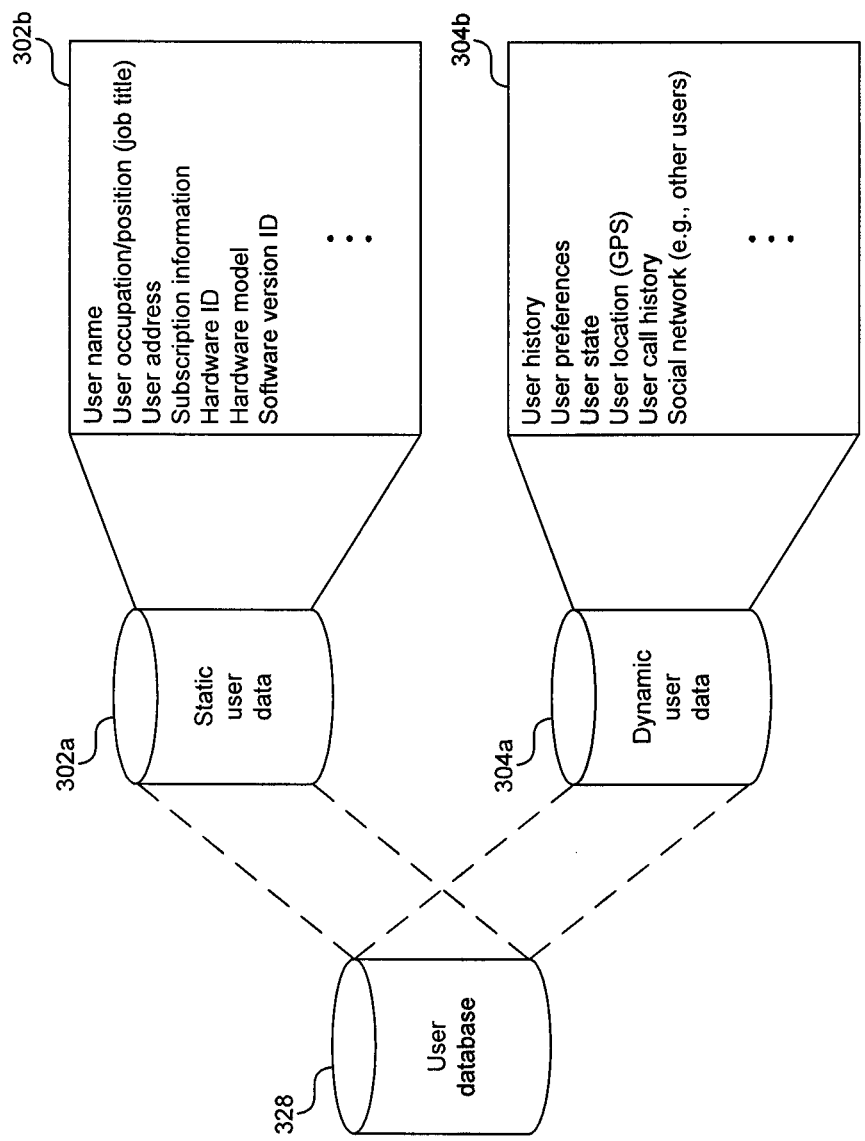
FIG. 3A depicts a block diagram illustrating a user database to store static user data and dynamic user data.
Figure 3B:
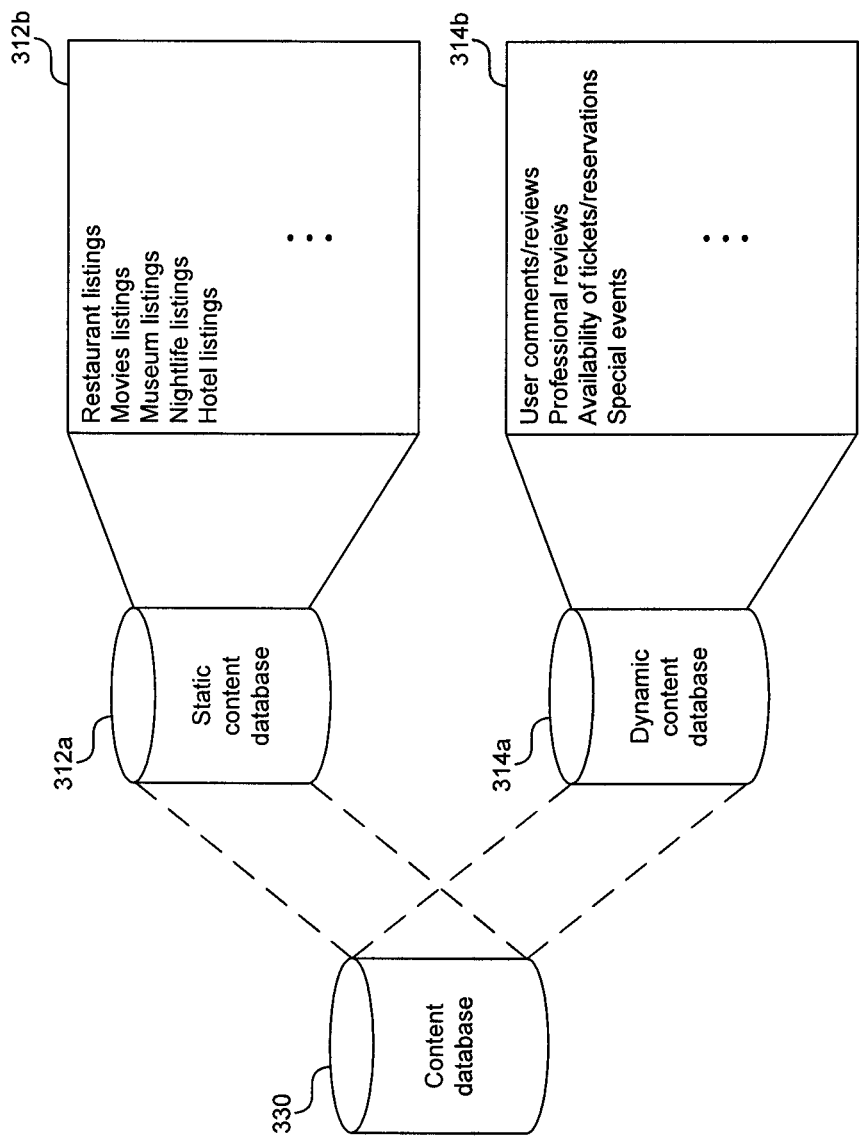
FIG. 3B depicts a block diagram illustrating a content database to store static content and dynamic content.

The databases 128 and 130 can be implemented via object-oriented technology and/or via text files, and can be managed by a distributed database management system, an object-oriented database management system (OODBMS) (e.g., ConceptBase, FastDB Main Memory Database Management System, JDOInstruments, ObjectDB, etc.), an object-relational database management system (ORDBMS) (e.g., Informix, OpenLink Virtuoso, VMDS, etc.), a file system, and/or any other convenient or known database management package. An example set of data to be stored in the user database 128 and content database 130 is illustrated in FIGS. 3A-3B.

The host server 124 is, in some embodiments, able to communicate with cell phone devices 102A-N via the mobile wireless network 106, telephone devices 108A-N via the telephone network 112, and/or client devices 114A-N via the network 118. In addition, the host server 124 is coupled to the content server 126 and is able to retrieve data from the user database 128 and the content database 130. In some embodiments, the host server 124 is able to assimilate data obtained from the content server 126 and/or databases 128/130 to provide informed suggestions to client-end devices, including the cell phone devices 102A-N, the telephone devices 108A-N, and/or the client devices 114A-N. T The communications that the host server 124 establishes with the client-end devices can be multi-way and via one or more different protocols. Any number of communications sessions may be established prior to providing a suggestion accepted by the users requesting assistance in making a decision. Each session may involve multiple users communicating via same or different protocols. For example, within a group of users choosing a coffee shop to conduct a meeting at, a user may be chatting via instant messaging, another over VoIP, and yet another over SMS.

The host server 124 communicates with the participants, in series and/or in parallel to obtain the necessary information from the users to generate one or more suggestions. In addition, the host server 124 can establish communication sessions with the content server 126 and/or databases 128/130 to identify additional information about the users, such as, but not limited to subscription information, historical information, preferences, and/or any other useful information which may indicate a user's likes and dislikes.

The host server 124 may also obtain information about business listings via communicating with the content server 126 and/or databases 128/130. For example, information regarding, hours of operation, special visitors, special events could be factored in when providing suggestions to a group of users attempting to reach a decision and/or an agreement. Further functionalities of the host server are described with further reference to FIG. 2.

The instant messaging server 134, can establish connections with one or more of the client devices 114A-N through any known and/or convenient protocol, such as, but is not limited to Session Initiation Protocol (SIP), SIP for Instant Messaging and Presence Leveraging Extensions (SIMPLE), Application Exchange (APEX), real time messaging protocol (RTMP), Presence and Instant Messaging Protocol (Prim), Extensible Messaging and Presence Protocol (XMPP), instant messaging and presence protocol (IMPP), Open Mobile Appliance (OMP), Instant Messaging and Presence Service (OMP), etc.

IM service providers that provide the IM services which can be accessed by mobile devices over a wireless network, can include, but are not limited to, AIM, Jabber, EBuddy, Windows Messenger, Yahoo! Messenger, QQ, Skype, Sametime, Xfire, ICQ, Gadu-Gadu, Paltalk, MXit, PSYC, Meebo, etc. The IM server 134 (e.g., a Jabber/XMPP server) can provide and manage one or more of the above mentioned protocols (e.g., SIP, OMP, XMPP) to provide access to the instant messaging network by allowing various IM software clients (e.g., Gabber, Exodus, Google Talk, etc.) to utilize the protocols to provide connectivity to end users (e.g., client devices 106A-106N).

Figure 2:
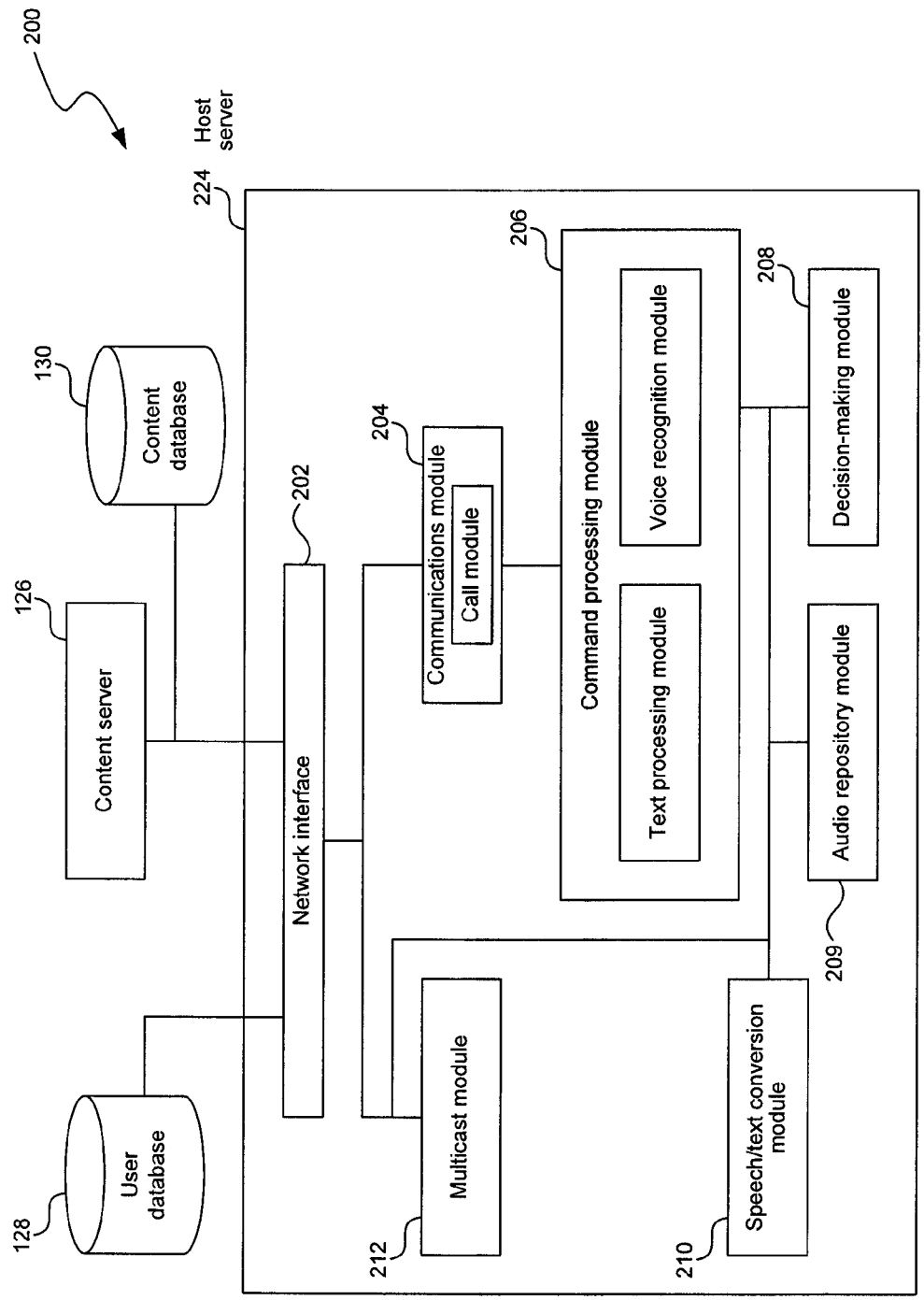
FIG. 2 depicts a block diagram illustrating a system to facilitate a decision-making process between a plurality of users, the system to include a host server coupled to a content server, a user database, and/or a content database.

FIG. 2 depicts a block diagram illustrating a system 200 to facilitate a decision-making process between a plurality of users, the system 200 to include a host server 224 coupled to a content server 126, a user database 128, and/or a content database 130, according to one embodiment.

In the example of FIG. 2, the host server 224 includes a network interface 202, a firewall (not shown), a communications module 204 having a call module, a command processing module 206 having a text processing module and/or a voice recognition module, a decision making module 208, an audio repository module 209, a speech/text conversion module 210, and/or a multicast module 212. The host server 224 may be communicatively coupled to the user database 128 and/or the content database as illustrated in FIG. 2. In some embodiments, the user database 128 and/or the content database 130 are partially or wholly internal to the host server 224.

In the example of FIG. 2, the network controller 202 can be one or more networking devices that enable the host server 224 to mediate data in a network with an entity that is external to the host server, through any known and/or convenient communications protocol supported by the host and the external entity. The network controller 202 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

A firewall, can, in some embodiments, be included to govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure. In some embodiments, the functionalities of the network interface 202 and the firewall are partially or wholly combined and the functions of which can be implemented in any combination of software and/or hardware, in part or in whole.

In the example of FIG. 2, the host server 224 includes the communications module 204 or a combination of communications modules communicatively coupled to the network interface 202 to manage a one-way, two-way, and/or multi-way communication sessions over a plurality of communications protocols. In one embodiment, the communications module 204 receives data, information, and/or messages over a gateway which converts mobile wireless data to a TCP/IP based message. Therefore, for example, SMS based messages that originate from a portable wireless device is received from a gateway. In one embodiment, the communications module 204 receives information over a gateway which converts data, messages, text, audio data, and/or DTMF that are originated from a telephone. Similarly, in one embodiment, the communications module receives communications from a network (e.g., Internet) via a web-based chat service (e.g., IM chat).

Since the communications module 204 is typically compatible with receiving and/or interpreting data originating from various communication protocols, the communications module 204 is able to establish parallel and/or serial communication sessions with users engaged in a decision making process. For example, members of a family may be contemplating among a number of venue options where to have a family dinner. The family members may be carrying on a discussion via a web-based chat service (e.g., IM service). The discussion may be carried out in a two-way dialogue, a three-way dialogue, and/or a multi-way dialogue (e.g., in an invite-only chat room or a public chat room). The communications module 204, can, in some embodiments, identify the participating parties of the decision making process and assimilate the relevant data based on the dialogue.

In other situations, the users in the decision-making process may utilize alternate modes of communication, such as cell phone and/or telephone. For example, the family members may be communicating via mobile device-originated SMS messages or via a telephone. In some embodiments, the users in the decision-making process are participating in the decision-making process via different communication channels.

For example, the parents can be on the phone while the children are communicating via SMS and/or IM. Thus, in some embodiments, the communications module 204 assimilates data and information relevant to a particular decision-making session from varying communication channels. In some embodiments, the communications module 204 filters out information in the communication session that may not be relevant to the decision-making process.

In addition, the communications module 204 can manage multiple sets of dialogues or communication sessions that pertain to sets of decision-making sessions. To achieve this, the communications module 204 can, in one embodiment, track user identities and/or hardware ID's of user devices. In addition, each user can cross identify to the host server 224 the other users that are participating in the communications thread. In some embodiments, the host server of the decision-making agent participates in communication threads of decision-making sessions. Thus, the communications module 204 tracks the dialogue (e.g., text, tone, speech, voice, etc.) of each communication thread that pertains to a decision-making process. The communications module 204, can include, one or more of, or any portion of the one or more of the above described functions, without deviating from the spirit of the novel art of the disclosure The command processing module 206 is any combination of hardware modules and/or software agents able to receive and process data/information relevant to a decision-making process. The data/information received may have originated from various protocols and may be in various formats, including, but not limited to, text, audio, speech, image, video, etc. In some embodiments, the data/information is received from the communications module 204.

In particular, the command processing module 206 may include a text processing module and/or a voice recognition module to process textual data and speech data, respectively. For example, data/information gleaned from a string of SMS text messages between a plurality of participants in a decision-making process can be forwarded to the text processing module. Similarly, in one embodiment, data/information gleaned from a string of web-based chat messages (e.g., IM chat, chat room, IRC, forum, web-blog, email, etc.) can be sent to the text processing module for identifying relevant information.

In a further embodiment, audio data/information gleaned from a voice-enabled communication session (e.g., phone call, VoIP, IM-chat, etc.) can be relayed to the voice recognition module for identifying the contents of the vocal dialogue. In some embodiments, the voice recognition module can include any number of software and/or hardware components to provide one or more of sound detection functions, audio signal processing functions, speech recognition functions (e.g., automatic speech recognition, computer speech recognition), speech processing functions, voice recognition functions, etc. For example, the voice recognition module, may internally include, or be externally coupled to a microphone, such as dynamic microphones, ribbon microphones, condenser microphones, array microphone, or any type of transducer that converts sound into an electrical signal for the purposes of detecting sound. Any number of microphones as suitable depending on the application and/or environment can be used.

The voice recognition module may further include software agents and/or hardware modules for speech recognition, as implemented by any known and/or convenient manner, such as, but is not limited to the Hidden Markov model (HMM)-based speech recognition and dynamic time warping (DTW)-based speech recognition. In other embodiments, the electrical signal representing sound may be sent to another module for sound processing, speech recognition and the like functions.

In some embodiments, the signals representing sound may be processed on the voice recognition module and sent to another module/device for speech recognition and/or voice recognition (e.g., speaker recognition) purposes. Speech processing includes processing of a digital and/or analog signal, and by way of example but is not limited to, enhancement of speech signals (e.g., noise reduction), speech coding (e.g., signal compression, time compressed speech), voice analysis, speech synthesis, etc. The voice recognition module, can include, one or more of, or any portion of the one or more of the above described functions, without deviating from the spirit of the novel art of the disclosure The decision-making module 208 is any combination of hardware modules and/or software agents able to assimilate data/information from various sources and to generate one or more suggestions to be provided to one or more users participating in a decision-making process based on the information obtained and received from various sources.

In one embodiment, the decision-making module 208 is coupled to the command processing module 206, the content server 126, the user database 128, and the content database 130. The content server 126 may be queried to obtain information about business listings. For example, the types of offerings at a place of business (e.g., tea, coffee, dessert, pastries, etc.), the types of activities offered by the business (e.g., roller coasters, miniature golf, late night dining, movie theaters, shopping, video games, etc.), hours of operation, user reviews/ratings, professional ratings, etc. Information about business listings can be obtained from a third-party content host and/or from the business itself (e.g., telephone query and/or web-based query).

For example, the business may sponsor ads or listings on third-party web sites. In addition, information about the business, such as hours of operation, may be obtained from the business web-site. Third-party content hosts that provide business information to consumers include but are not limited to, the yellow pages, web-based peer-review sites (e.g., Yelp.com, Citysearch.com), and/or professional ratings (e.g., Zagat ratings, Wine Spectator.com). In some embodiments, the decision making module 208 communicates with the content database 130 to identify information about business listings that may be of facility in the decision-making process. Similarly, the content database 130 may be managed by a third-party content host and/or by the business listing.

In some embodiments, the content database 130 is typically queried for static information, such as listings of businesses in specific geographical locations, as identified by area codes and/or zip codes, for example. Static information including, but is not limited to, listings of movie theaters, restaurants, bars, cafes, theme parks, libraries, hotels, etc. can be retrieved from the content database 130. On the other hand, dynamic information associated with business listings, such as, but is not limited to, user comments, availability of tickets/reservations, and special events at a particular venue, may be obtained from the content server.

Similarly, the user database 128 can provide information about users engaged in a decision-making process. Sometimes, user information not explicitly provided by a user may be useful in identifying suggestions to facilitate a decision-making process. For example, although users will typically specify a preferred dining cuisine, the user may not specify a preferred geographical location. By communicating with the user database 128 and accessing user information, such as service subscription data, the decision-making module 208 can have access to approximate user locations in the decision-making process to factor into determining the suggestion made to the users seeking assistance.

Additional information that can be obtained from the user database include, by way of example but not limitation, relationships between users in a decision making process (e.g., family, colleagues, hierarchical information between users, high school peers, college friends, etc.), age of users, history of user preference and suggestions previously made, user feedback and ratings of previous suggestion, and/or any other data that may be relevant to identifying a business to frequent and/or reaching a consensus among a group of people. In some embodiments, the decision-making module 208 can obtain real-time or near real-time information about the users, such as, but not limited to, GPS location data, schedules (e.g., suggesting a restaurant with an appropriate wait time if members of the group have tight schedules, or suggesting a place that is close if calendar entries are adjacent), user attitudes (e.g., behavioral information based on the contents of discussion), etc.

For example, based on the content of discussion among the users in the decision making process, the decision-making module 208 may be able to sense agitation, anger, and/or frustration in one or more of the users based on usage of certain words. In these situations, the decision making module 208 may factor into emotions of the users to generate the suggestions that the users are likely to accept. For example, the preferences of an easy going and nonchalant individual may be weighed lesser than one who is adamant and stubborn.

Thusly, in one embodiment, based on the information explicitly provided by the users, the decision-making module 208 generates one or more suggestions determined to have some likelihood of acceptance by a majority of the users. In some embodiments, the decision-making module searches for information not explicitly submitted by the users to refine a list of suggestions. For example, a first list of suggestions that would satisfy the criterion provided by the users in the decision-making process is too big, the decision-making module 208 may proactively query one or more of the participating users for additional information and criteria to refine the list of options. In some embodiments, in the situation where the list of search results is too big, the decision-making module 208 may, instead, query one or more of the content server, content database, and/or user database to identify additional information to refine the list of suggestions to be provided to the user.

In some embodiments, the decision-making module 208 provides a facility for the users to play a game to determine who would decide for the group, for example. Games including, rock-paper-scissors, poker, blackjack, and/or any other game where there are winners and losers can be employed. The decision-making module may provide a game interface via the web. In some embodiments, the games are provided over a voice portal for users over the telephone or other voice/audio-enabled device. The decision-making module 208, in some embodiments, further includes the ability to randomly make a selection. One or more suggestions can be randomly selected based on user specification. Suggestions and/or decisions can be randomly made when a pre-determined situation is identified, such as, when a number of participants have no further preferences.

The host server 224 in the example of FIG. 2, in accordance with one embodiment, further includes the audio repository module 209. The audio repository module 209 can be any combination of hardware modules and/or software agents able to store and/or read audio data, in a variety of formats, including, but not limited to, mp3, mp4, m4a, m4p, aac, wma, ra, wav, ogg, flac, aiff, raw, aw, DVD, CD, Blu-Ray, HD-DVD, DTS-CD, SACD, etc. The audio repository module 209 can be, in some embodiments, accessible by the decision-making module 208. For example, audio data (e.g., pre-recordings, synthesized audio tracks, speech, voice, music, etc.) can be retrieved from the audio repository module 209 when the decision-making module 208 provides a gaming environment to a user via an audio-enabled device.

The audio track can include, for example, but is not limited to, speech to provide for gaming instructions and/or soundtracks for background music. In some embodiments, the audio repository module 209 includes a standard voice greeting for users that have requested assistance from the decision-making agent. The audio repository module may further include digital signal processors (DSP) that support generation of digital music files and/or audio effects/mixing.

The speech to text conversion module 210 can be any combination of hardware modules and/or software agents able to convert speech to text and/or vice versa. In some embodiments, the conversion module is able to convert text to speech (e.g., synthesized speech) for transmission over an audio-enabled device (e.g., portable phone, telephone, VoIP, voice-enabled IM chat service, etc.). The conversion module may further be able to synthesize voice according to selected dialects or languages, based on user settings. In addition, the conversion module 210 can include speech recognition functions to convert speech data into text-based data to be presented to users for example, via SMS and/or web-based chat services.

The multi-cast module 212 can be any combination of hardware modules and/or software agents able to provide suggestions and/or decisions to one or more users. Depending on the communication channel established with a user, the multi-cast module can communicate with the conversion module 210 to obtain audio data and/or text data to be provided to the users. In some embodiments, suggestions and/or decisions can be provided based on user specified settings.

The host server 224 can be implemented using one or more processing units, such as server computers, UNIX workstations, personal computers, and/or other types of computes and processing devices. In the example of FIG. 2, the host server 224 includes multiple components coupled to one another and each component is illustrated as being individual and distinct. However, in some embodiments, some or all of the components, and/or the functions represented by each of the components can be combined in any convenient and/or known manner. For example, the components of the host server may be implemented on a single computer, multiple computers, and/or in a distributed fashion.

Thus, the components of the host server 224 are a functional unit that may be divided over multiple computers and/or processing units. Furthermore, the functions represented by the devices can be implemented individually or in any combination thereof, in hardware, software, or a combination of hardware and software. Different and additional hardware modules and/or software agents may be included in the host server 224 without deviating from the spirit of the disclosure.

FIG. 3A depicts a block diagram illustrating a user database 328 to store static user data 302A and dynamic user data 302B, according to one embodiment.

In the example of FIG. 3A, the database 302A can store static user data, including user information of the service subscribers of wireless services and/or service subscribers of the decision-making agent, and/or any user information that is not updated for a predetermined amount of time. For example, static user data can include descriptive data of personal information such as, but is not limited to, a first name and last name of the user, a valid email ID, a unique user name, age, marital status, occupation, location, education, home town, schools attended, number of siblings, heritage, ethnicity, race, etc. The user information further includes interest information, which may include, but is not limited to, activities, hobbies, professional information, photos, etc.

In one embodiment, static user data stored in database 302a is explicitly specified by the user. For example, when the user (e.g., visitor/service subscriber) signs up for wireless services, telephone services, and/or IM services, a set of information may be required, such as a valid email address, an address of service, a valid credit card number, social security number, a username, and/or age. The user information form can include optional entries, by way of example but not limitation, location, activity, hobbies, ethnicity, photos, etc. Examples of user data stored in the static user data include those shown in 302B, including, but is not limited to, user name, user occupation/position, user address, subscription information, hardware ID, hardware model, software version ID, etc.

The database 328 can also store dynamic user data, for example, in database 304a. Dynamic user data can either be explicitly submitted by the user or provided via one or more software agents and/or hardware modules coupled to the dynamic user database 304A. For example, a user can periodically update his/her restaurant and cuisine preference information which can be stored in the dynamic user database. Similarly, user preferences can be automatically identified and stored in the database. In some embodiments, dynamic information such as user location (e.g., based on location data as identified by GPS or other (near) real-time location identification technology), user call history, user contact list can be stored in a dynamic user database 304A.

Examples of user data stored in the dynamic user database include those shown in 304B, user data such as, but is not limited to, user history (e.g., previous choices, preferences, agreeableness to suggested venues), user preferences (e.g., family setting, Chinese food, late dining, vegetarian, etc.), user state (e.g., mood, state of mind, user relation to other users, etc.), user location (e.g., GPS, zip code, area code, etc.), user call history, social network (e.g., user's contact list, relationship with other users, etc.).

FIG. 3B depicts a block diagram illustrating a content database 330 to store static content 312A and dynamic content 314A, according to one embodiment.

In the example of FIG. 3B, the database 312A stores static content, including, but not limited to, yellow page information, businesses in a locale based on zip codes and/or area codes, contact information of businesses, hours of operation, average cost for a meal. For example, static content can include descriptive data of business listing information such as, but is not limited to, name of business listing, type of business, type of offerings, price ranges, menus, hours of operation, movies showing, hotels in a particular locale, amenities offered at a hotel, type of art displayed, etc. In one embodiment, static content stored in database 312A can be maintained and managed by the business itself or a third-party content manager.

Examples of static content stored can include those shown in 312B, restaurant listings, movie listings, museum listings, nightlife listings, and/or hotel listings, etc. The database 330 can also store dynamic content, for example, in database 314A. Dynamic content can either be explicitly maintained by business entities or by a third-party content manager. For example, business entities can update information regarding special events and can be stored in the dynamic content database 314A. Similarly, the dynamic content database 314A can be coupled to any hardware module and/or software agent able to retrieve updated information from other devices and/or databases.

The dynamic content database 314A can be coupled to a third-party community review site where users can rate and review businesses based on quality and/or service. Examples of data stored in the dynamic content database 314B include, but are not limited to, user comments/reviews (e.g., number of stars, comments on service, seating, price, quality of food, selection of wine list), professional reviews (e.g., Chef's rating/comments, Zagat ratings), availability of tickets/reservations (e.g., approximate length of wait time for a table of 2, types of tickets available for a sports event, types of seats available for a concert), and/or special events (e.g., special appearance, book signing by author, happy hour, dollar drinks, etc.).

Figure 4:
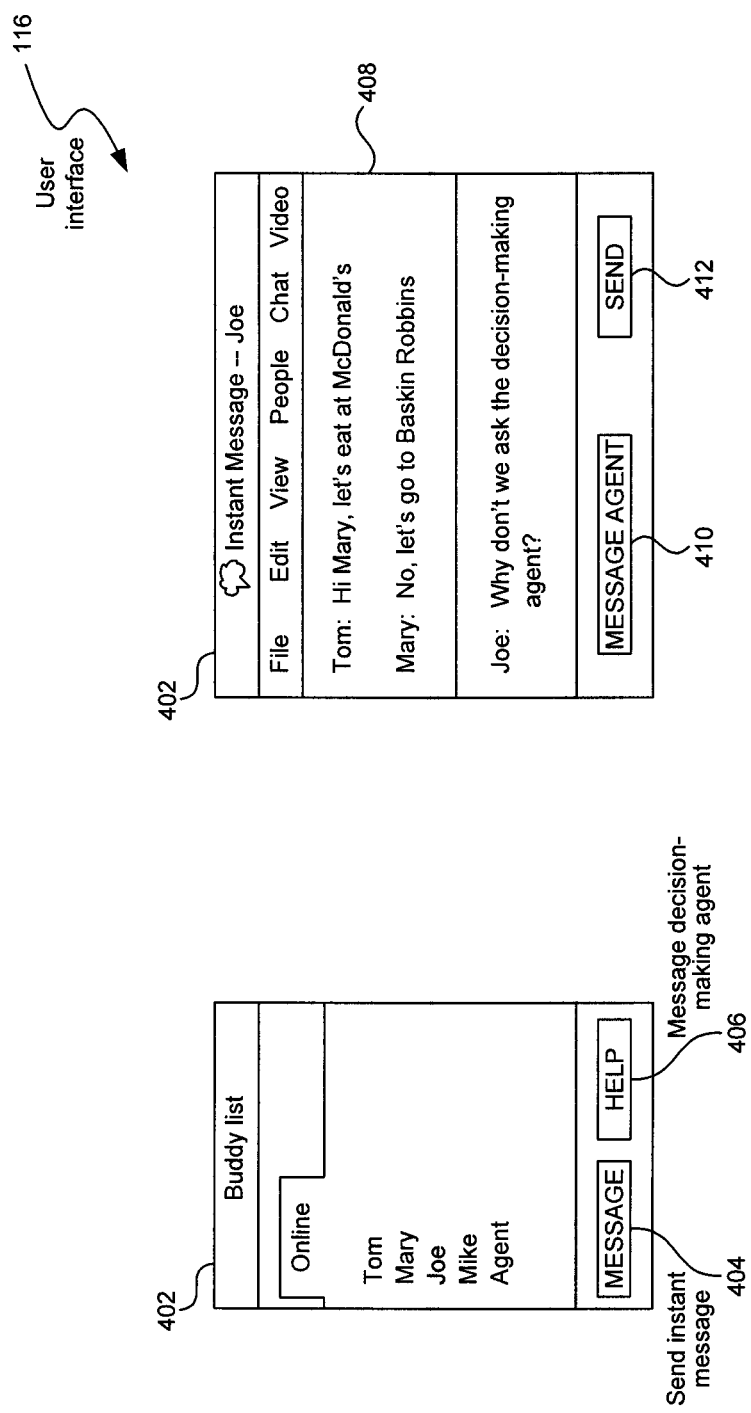
FIG. 4 illustrates example user interfaces of an instant messaging service employing a decision-making engine.

FIG. 4 illustrates example user interfaces 116 of an instant messaging service employing a decision-making engine, according to one embodiment.

The example user interfaces 116 can be displayed on a user device connected to an IM server over a network. In some embodiments, the IM service have integrated within it, a decision-making engine trigger. In this example, the decision-making agent is added as a buddy in the buddy list 402. In some embodiments, the 'MESSAGE' button is utilized to send a message and/or open a dialogue box to communicate with a buddy and/or an agent. It may be desirable to remain in the ongoing communication thread, though a sidebar might be desirable, particularly if the results are multicast. A user can double-click on the entry 'Agent' to send the decision-making agent a message or to request assistance. In addition, the user can activate the 'HELP' button displayed on the buddy list to send a message to the decision-making agent. In other embodiments, further methods of integrating a trigger to request assistance in a buddy list are contemplated, including, but are not limited to, incorporating an option in a drop-down menu list, in a java-enabled applet, and are considered to be within the scope of the disclosure.

In the example dialogue box 402 where user 'Joe' is engaged in a three way chat with buddies 'Tom' and 'Mary' about where to go to eat. User 'Joe' suggests that an agent could be brought in to the conversation. In one embodiment, the agent is triggered via the button 'MESSAGE AGENT' 410 in the dialogue box 402. Once the agent has been triggered, the agent can join the IM chat session. In some embodiments, the agent can participate in the dialogue via a side bar communication path, such as via a voice-enabled device (e.g., phone) or email. Other methods of integrating an agent trigger in an IM dialogue box are contemplated and considered to be within the scope of this disclosure. For example, the menu options in the dialogue box can include a menu list related to triggering an agent, and in some embodiments, including various options and/or configurable options associated with triggering the agent.

Figure 5:
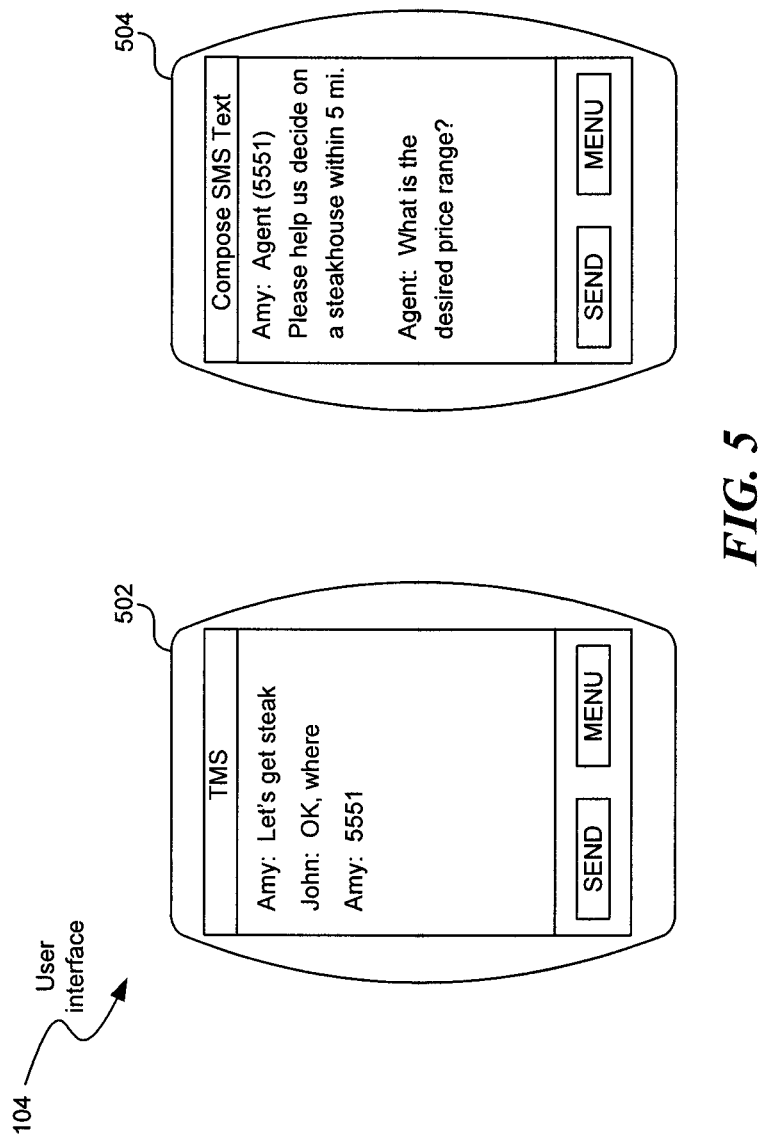
FIG. 5 illustrates example user interfaces of a mobile device depicting a string of SMS messages.

FIG. 5 illustrates example user interfaces 104 of a mobile phone device depicting a string of SMS messages, according to one embodiment.

User interfaces 502 and 504 are examples of screens displayed on a mobile device for requesting assistance from a decision-making agent (engine). In the example of FIG. 5, the user interfaces allows a user to send an SMS message to a predetermined address to request assistance from a decision-making agent. As shown, the user 'Amy' triggers the agent in screen 502 by sending a text message to '5551' and requests the agent to help users 'Amy' and 'John' to pick a steak house within 5 mi. ("Please help us decide on a steakhouse within 5 mi.). The agent, can, in some embodiments refine the search results by making queries, either predetermined or on a case-by-case basis.

In the example shown in the user interface 504, the agent attempts to narrow the search fields by requesting the users to enter a desired price range for the steakhouse ("What is the desired price range?"). In other embodiments, alternative methods of requesting intervention by the decision-making agent in a decision-making process via SMS are contemplated, such as, but are not limited to, activating button on the side of the SMS text screen, a button in the main menu, are considered to be within the scope of this disclosure.

Figure 6:
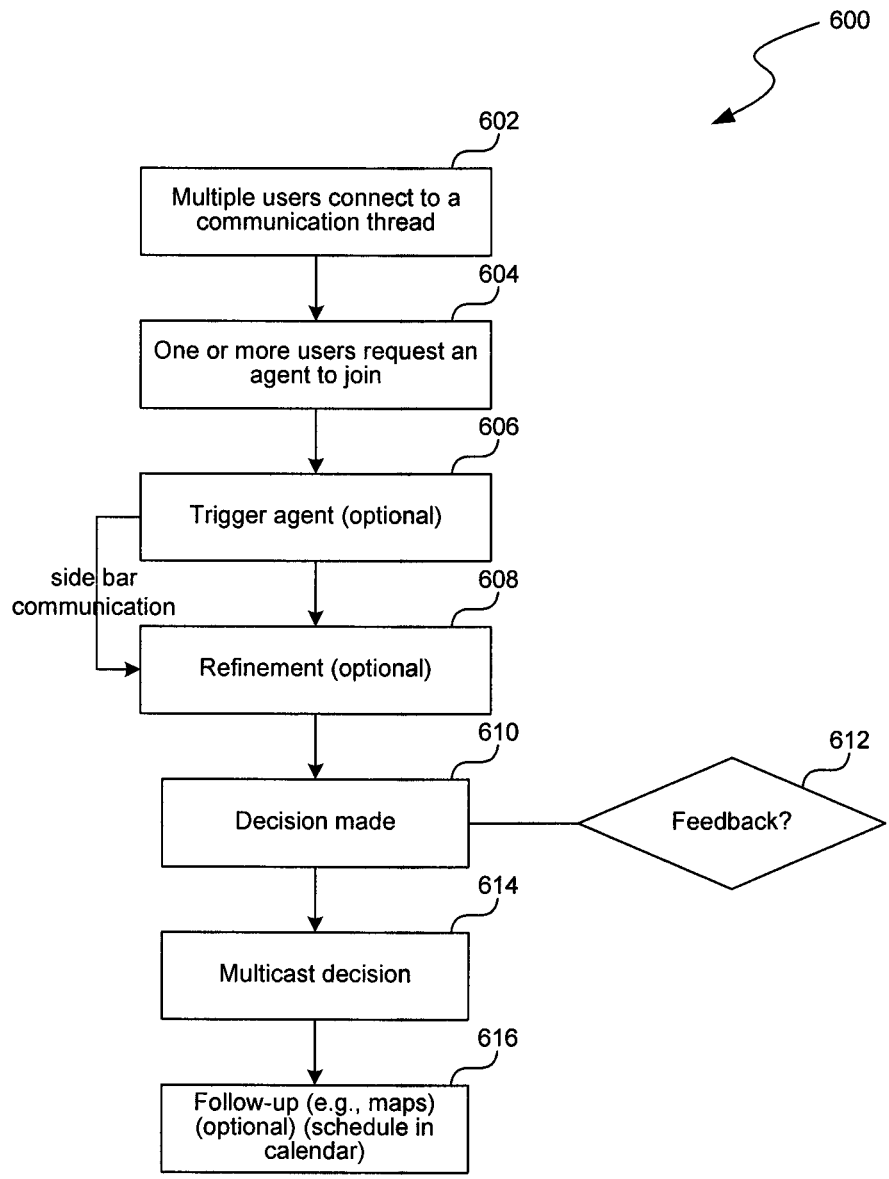
FIG. 6 depicts a flow diagram illustrating a process of facilitating a decision-making process.

FIG. 6 depicts a flow diagram 600 illustrating a process of facilitating a decision-making process, according to one embodiment.

In process 602, multiple users (e.g., at least one user) are connected to a communication thread. The users may have been participating in a discussion session. In some situations, some of the users may have received a request to join the conversation by the original participants via one or more communication channels. The users may be connected to a communication thread via a multi-way teleconference call. In addition, the users may be connected to the communications thread via an SMS text string from mobile devices. The users may also be participating in the discussion via a multi-way web-based chat session/chat room. The web-based chat room may be voice-enabled, such as, via VoIP, Skype, Voice of Wi-Fi (VoWi-Fi), and/or any other web-based voice communication services and protocols.

In some embodiments, the users may be connected to a communication thread through different communications protocols. For example, a user may be speaking on a cell phone to another user via a voice-enabled web-based chat service. Similarly, a message can be sent from a web-based interface and delivered to a portable device (e.g., via SMS). In other embodiments, the users, although participating in the same communication thread, may or may not be directly connected to one another. For example, user A may be speaking to user B on the telephone, while user B is chatting with user C via web-based IM services, while all three users A, B, and C are participating in the same dialogue. User B may be relaying user A's opinions to user C and vice versa. Other types of communication threads are contemplated to include additional communication modes and configurations of communication modes between users in a discussion, and are considered to be within the scope of the disclosure.

In some embodiments, the users in the communication thread are engaged in a group discussion where a consensus and/or agreement is to be made among at least a portion of the users, a decision-making agent can be requested to moderate the process. For example, the users may wish to decide on a city to visit for Labor Day weekend, a hotel to stay at in the locale, arrangements for transportation, sites to see (e.g., monuments, state parks, scenic drives), places to visit (art museums, computer museums, shopping malls, cafes), dining venues, etc. In these situations, the participants in the decision-making process may wish to engage a decision-making agent to provide and assimilate the relevant information related to the users and the activities/businesses which may affect the optimal choices that the users may or may have access to.

In process 604, one or more users request an agent (e.g., the decision-making agent) to join the discussion to facilitate and/or moderate the decision-making process. For example, in process 606, the agent can be optionally triggered. Depending on the mode of communication, an agent can be requested and/or triggered in one or more of many ways. In one embodiment, the agent is requested via calling a pre-determined phone number. The agent can be triggered by sending a text-based message (e.g., SMS) to a pre-determined number and/or an IM message to an agent (e.g., identified by a predetermined username). In some embodiments, the agent is triggered via sending an email message (which may include text, images, videos, and/or other multi-media) to a predetermined email address.

Of course, information provided by the agent can be presented to the one or more users in a variety of formats, including but is not limited to, speech, synthesized speech, recorded speech, recorded sound, synthesized sounds, and/or any other audio-based form of presenting information. Information, suggestions, and/or questions provided by the agent can further be provided to users via text including, by way of example but not limitation, SMS, USSD messages/commands, web-based chat (real-time, near real-time, not real-time), bulletin boards, forums, IRC, email, etc.

In addition, information provided by the agent can be made available to the one or more users in a pull or push model based on default and/or configured settings. For example, communications from the agent can be sent to the users when available. Communications from the agent can also be provided to the users upon request. For example, a notification can be sent to the users indicating that a new message is available from the agent where further action from the user is to be taken by the user to access the message.

Figure 7:
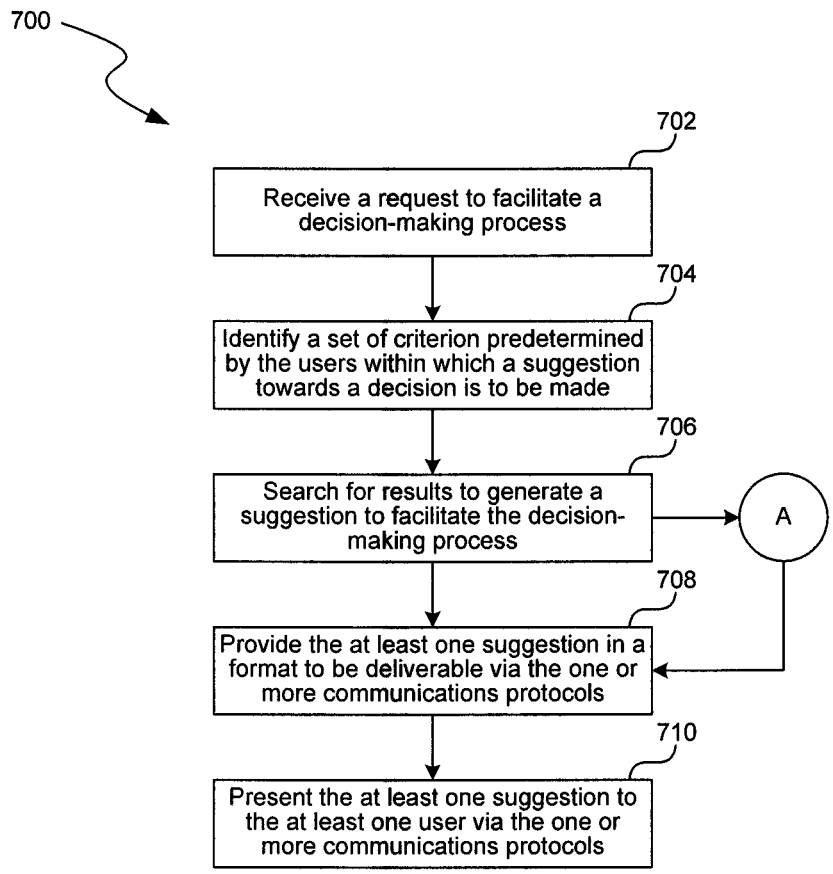
FIG. 7 depicts a flow diagram illustrating a process of identifying a set of suggestions to be presented to users towards facilitating a decision-making process.
Figure 8:
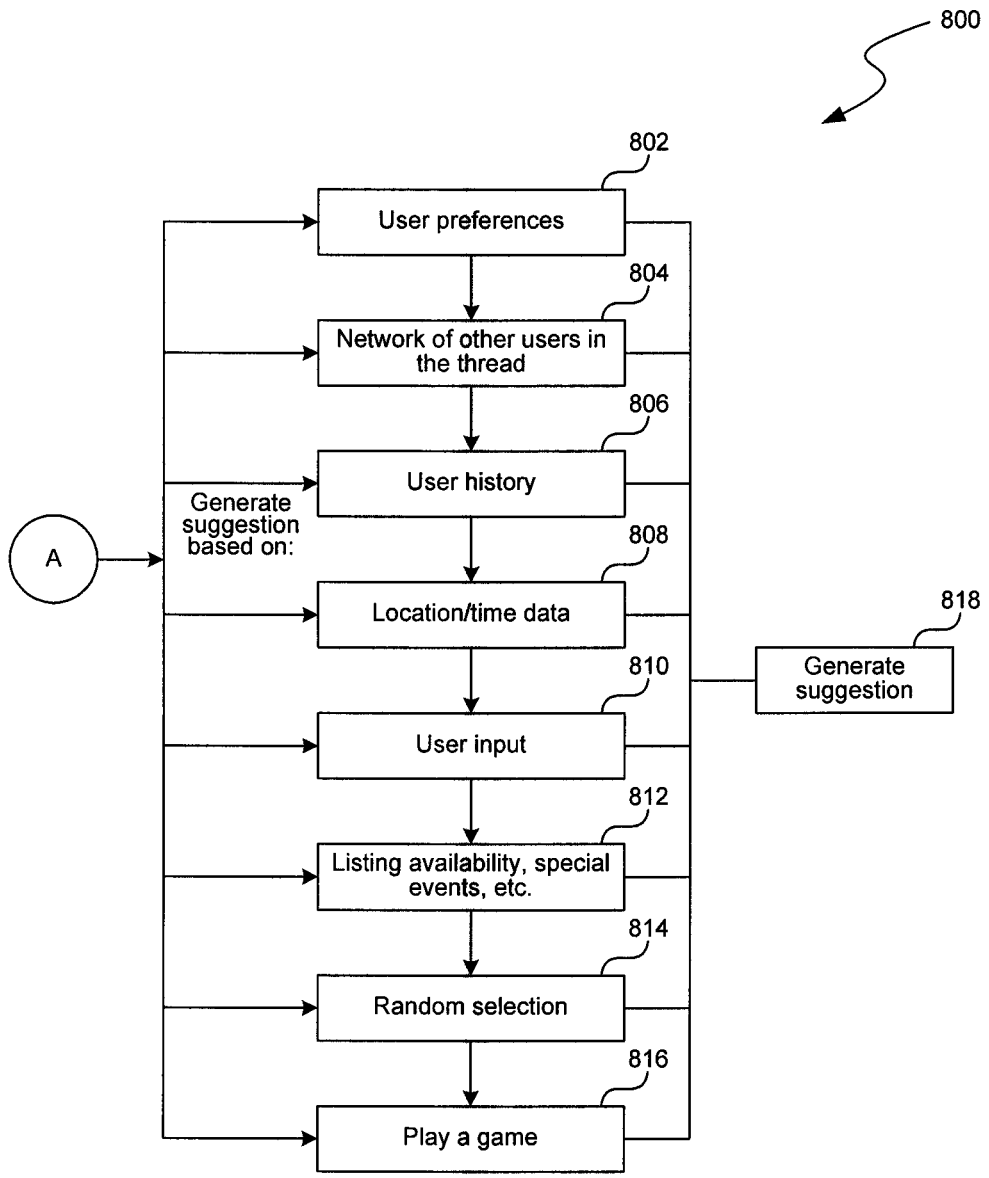
FIG. 8 depicts a flow diagram illustrating an example set of methods for generating a set of suggestions.

Once the agent is triggered, a series of communications may take place before suggestions can be made, for example, with further reference to the flow chart of FIGS. 7-8. The series of communications may include, but are not limited to, the one or more users stating preferences to the agent, the agent requesting additional information from the one or more users. Note that in a given communications thread where a decision is to be made among several users, communications between the agent and the users can be multi-casted, directed towards a subgroup of users, and/or directed towards the relevant individual. Such options may include a default setting and/or be configurable by the users.

In one embodiment, the agent can communicate with the users using side bar communications. For example, if the users are attempting to reach an agreement in a multi-way teleconference call, the agent can participate in the process via another communications means, for example IM chat, or email. Other side bar communication modes are contemplated, such as, but are not limited to SMS, USSD, and do not deviate from the novel art of the disclosure. In some embodiments, a number of side communication channels may be utilized. It may be noted that the decision agent can carry on multiple communication channels on simultaneously, unlike a normal human. An agent is not necessarily like a single human operator, but can instead replicate itself into multiple 'computerized operators' to engage in simultaneous live sidebar conversations with individuals as needed.

Once the agent has identified a list of suggestions, in process 608, a refinement process of the suggestions may be suitable, in some situations. The refinement process can take upon one or more of many forms. The refinement process may be performed automatically when a list of suggestions is too long, for example, the refinement may not involve the users and be automatically carried out by the agent. In some situations, the agent may not have enough data to narrow down the search results and thus queries the users for additional preferences or requirements to narrow the search results.

In some situations, the users are not able to reach an agreement based on the list of suggestions provided by the agent. Therefore, a refinement process, can, in some embodiments, be performed by the agent to narrow the options, broaden the options, and/or come up with an additional set of options. Similarly, the refinement process can be performed automatically (e.g., based on existing information) and/or with the involvement of users (e.g., requesting additional information from the users).

In process 610, once a list of suggestions has been refined, if necessary, a decision is made. In some embodiments, the agent makes a final decision based on user input and other related factors. If the agent makes a final decision, in process 612, the users are queried for feedback regarding the decision, or in some instances, the list of suggestions. The agent can continuously query the users for information and preferences until the set of options are narrowed down to a final option. In some embodiments, the agent can provide a predetermined set of options (e.g., two choices) for the users to make the final decision. The final decision maker could be configured to be made by the agent or the users. Similarly, users can configure the agent to provide them with a predetermined number of suggestions of which the users can decide from.

Once a decision has been made, by the agent and/or by one or more of the users, in process 610, the decision is broadcasted to the other users, in process 614. The decision can be broadcasted via one or more of many communication channels, based on a per-user setting and/or a per-session setting. For example, the decision may be emailed to the users in the decision making process. Some users may have set configurations to receive the decision via SMS in addition to emailing the decision. Similarly, the decision may be sent over a voice call where the decision is presented in audio format (e.g., music, speech, recorded sound, etc.). In some embodiments, a group administrator of a group discussion can indicate that each participant is to receive an email in addition to receiving a notification/confirmation via specified user preferences.

In process 616, the agent optionally follows-up with the users by providing them with additional information relevant to the decision made. For example, the agent can automatically send the user a map/direction of the destination, an itinerary of the trip, etc. In addition, the agent can enter the corresponding events into a user's calendar. In some embodiments, the follow-up settings are configurable on a per-user basis and/or a per-session basis. In some situations, for example, an administrator of a discussion session may have override authorities in per-session settings, such as requiring that a calendar event be automatically added based on the decisions reached. Other follow-up options related to event planning, scheduling, decision making, are contemplated and do not deviate from the spirit of the disclosure.

FIG. 7 depicts a flow diagram 700 illustrating a process of identifying a set of suggestions to be presented to users to facilitate a decision-making process, according to one embodiment.

In process 702, a request to facilitate a decision-making process is received. The request can be received, by the decision-making agent, via one or more of many channels, for example, text, voice, web, telephone, wireless, etc., as described in detail with further reference to the description associated with the example flow chart of FIG. 6. In most instances, the request/trigger is initiated by a user participating in a discussion session with a group of people attempting to reach a consensus and/or agreement. The request/trigger can be initiated via one or more of many communication channels, such as, but not limited to those discussed in association with the example of FIG. 6.

In process 704, a set of criterion predetermined by the users within which a suggestion towards a decision is to be made is identified. The set of criterion are typically explicitly stated by users regarding their preferences and/or limitations on the options they are willing to explore. For example, a user may specify a desire to dine at a restaurant with Asian cuisine. A second user in the group may indicate a dislike for steak or other red meats, etc. Thus, the agent can monitor the discussion for explicitly stated user preferences and/or requirements and identify the user criteria. In addition, the agent can actively participate in the dialogue and query the users for preferences and/or requirements. In some embodiments, the agent tracks user preferences and stores them for future reference.

In process 706, based on the set of criterion specified by one or more users, the agent searches for results to generate one or more suggestions to facilitate the decision-making process. Having information about the users' likes and dislikes, the agent can perform an initial search for options that satisfy the criterion set by the users. In addition, with further reference to FIG. 8, the list of potential options may be refined based on the one or more of the steps in the flow chart of FIG. 8. In some embodiments, the initial search for options may be performed based on one or more of the methods referenced in the flow chart of FIG. 8.

Once the agent has identified at least one suggestion based on, for example, one or more of the methods described in the example of FIG. 8, in process 708, the suggestions are provided in a format that is deliverable via one or more communications protocols. The suggestions can be converted to audio format from text or vice versa. For example, if the user is engaged in a communications session with the agent over the voice-enabled communications channel (telephone, VoIP, etc.), the suggestions and/or decisions are converted to an audio format to be presented to the user.

In process 710, the suggestions and/or decisions are presented to the users via one or more communications protocols. The communications protocol may be determined by the channel through which the users are communicating. In some embodiments, the communications protocol may be a side bar communications channel between the user and the agent. In other embodiments, a preferred communications channel through which a user wishes to receive notifications from the agent is configurable, for example, on a permanent basis, a per-use basis or per-session basis. Multiple preferred communications channels can be specifiable.

FIG. 8 depicts a flow diagram 800 illustrating an example set of methods of generating a set of suggestions, according to one embodiment.

In process 802, user preferences are considered in the decision-making process. User preferences may include both explicit preferences and/or implicit user preferences. Explicit preferences can include, but are not limited to, preferences specified by users during the discussion, such as those specified by user input in process 810. User input can be determined in response to a query and/or identified from the dialogue/conversation with a group of people within which a decision is to be made. In some embodiments, the decision-making agent may provide a default form to be filled out by the users such that basic information relevant to the decision making process can be obtained. In some embodiments, the decision-making agent merely monitors the dialogue and retrieves the information pertinent to the decision-making process.

The decision-making agent can act as another user participating in the conversation and interspersing the users with questions when deemed necessary. In addition, preferences can be indicated by users in a subscription process (e.g., preference for non-smoking seating area, within 10 mi. from home, etc.), user profile information (e.g., liking for sushi and sake) etc. Implicit preferences can include, by way of example but not limitation, preferences deduced from a user profile (e.g., based on user hobbies, favorite activities), etc.

In process 804, the network of other uses in the thread is accounted for in the decision-making process. The preferences (e.g., implicit and/or explicit) of other users in the decision making process can be considered. In some embodiments, the relationships between users in the communications thread are identified and factored into the decision-making process. For example, if the agent determines that a family is trying to decide on where to go for a family vacation, the agent may weigh the parents' opinions higher than the children's opinions. Similarly, if a group of people who are colleagues are attempting to decide on a lunch venue, the identified superior may be given more weight during the decision-making process.

In process 806, user history is factored into the decision-making process. User history can include, but is not limited to, frequently visited venues, activities engaged in, past decisions made, browsed websites indicative of preferred business listings, etc. In some embodiments, user history of the participating users is accounted for in the decision-making process. In process 808, user location data and/or time data are considered. User location data can be identified from user subscription information, including, area code, zip code associated with service account. In addition, real time or near real time geographical data can be determined from GPS-enabled user devices. In particular, suggestions can be made based on user location such that travel time and distance do not exceed a predetermined limit for the users.

In some embodiments, current time is taken into account to provide suggestions towards facilitating reaching an agreement/consensus. In process 812, listing availability and special events are factored into consideration, sometimes, in conjunction with identified timing data of the request to facilitate a decision-making process. For example, different venues have events at certain hours, such as happy hour, live band, and kids' specials. In some embodiments, availability of a venue (e.g., ease of parking, available tickets, time of reservation, length of wait, etc.) is also factored into the process. For example, the agent may have real-time access to databases of such information and can be factored in when users do not wish to wait in line, etc.

In some embodiments, in addition to identifying user likes and dislikes from user history, user temperament, personality and/or mood can potentially be deduced. For example, user's likeliness of accepting the accepting the agent's suggestions, agreeableness to others' suggestions in the past, etc. Suggestions and decisions can be made based on hypothesized temperament of the participating users.

In process 814, selections may be made randomly. For example, a set of suggestions can be identified based on random selections and provided to the users to make the final selection. In some embodiments, the first set of selections are identified systematically and narrowed down via a random process. Any random selection algorithm may be used. For example, one or more dice may be rolled and roulette (e.g., a "restaurant roulette") may be played. Similarly, a suitable random number generator may be used. Further random selection methods are contemplated and do not deviate from the novel art of this disclosure. In some embodiments, the occurrences during which to utilize a random selection method to facilitate a decision-making process is user specified. In some embodiments, the agent is preconfigured. d to employ a random method under a set of pre-identified situations, for example, when the participating users are non-opinionated towards the final decision.

In process 816, a game is played among the participating users to come to a decision. For example, the users can play rock-paper scissors, spin the bottle, or flip a coin to come to a decision. Other games that can be provided via a web-interface, a voice portal, IM, or other communication means to facilitate a decision making process are contemplated and are considered to be within the scope of the disclosure. Note that any one, subset/combination of methods can be utilized when identifying one or more suggestions to be provided to the users, during any stage of the decision process. For example, a first set of methods may be employed to identify a first set of suggestions, and a second set of methods (one or more of partially overlapping set or non overlapping set of methods with the first set) can be utilized in a refinement process, either based on user feedback or mere virtue of there being too many suggestions. Additional methods and factors to consider in association with systematic decision making, random decision making, and/or game-based decision making are contemplated and are considered to be within the scope of this disclosure.

Figure 9:
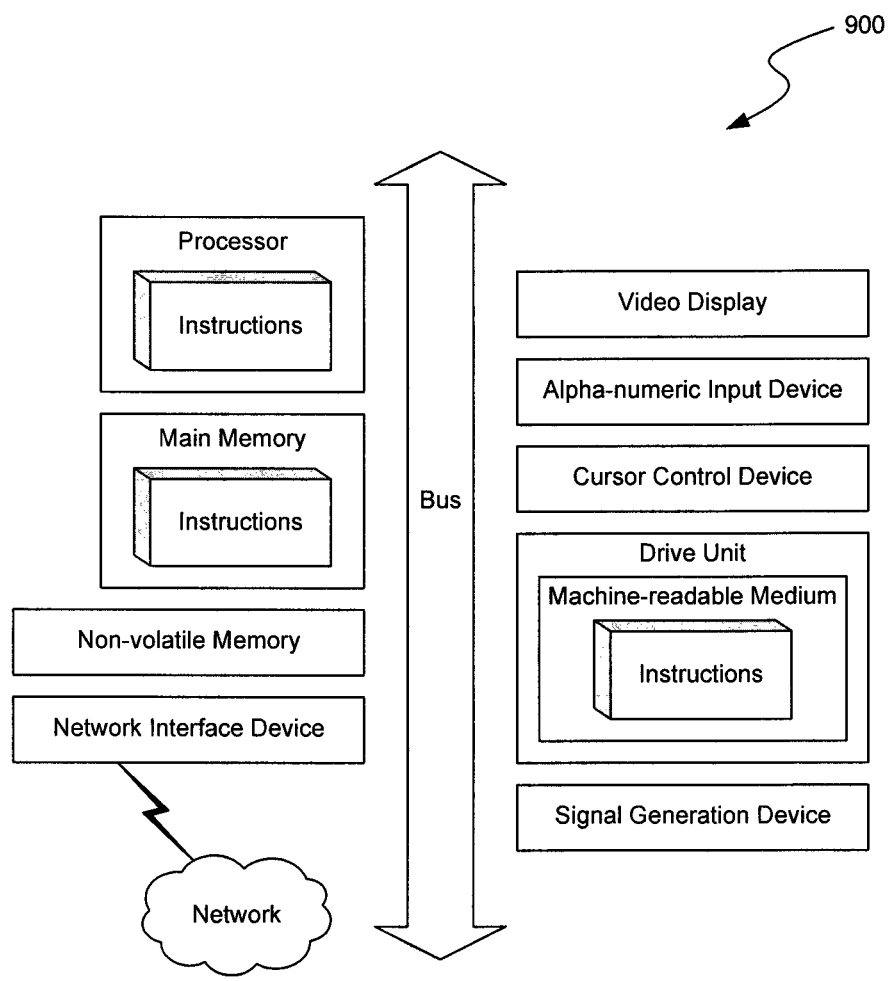
FIG. 9 shows a diagrammatic representation of a machine in the example form of a computer system within which a set of instructions, for causing the machine to perform any one or more of the methodologies discussed herein, may be executed.

FIG. 9 shows a diagrammatic representation of a machine in the example form of a computer system 900 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a web appliance, a network router, switch or bridge, or any machine capable of executing a set of instructions (sequential or otherwise) that specify actions to be taken by that machine.

While the machine-readable medium is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine or computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Although embodiments have been described with reference to specific example embodiments, it will be evident that the various modification and changes can be made to these embodiments. Accordingly, the specification and drawings are to be regarded in an illustrative sense rather than in a restrictive sense. The foregoing specification provides a description with reference to specific exemplary embodiments. It will be evident that various modifications may be made thereto without departing from the broader spirit and scope as set forth in the following claims. The specification and drawings are, accordingly, to be regarded in an illustrative sense rather than a restrictive sense.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method, comprising:
   detecting, at a server, a request from a user to facilitate a decision making process for a group of users, including the user, wherein, the group of users are participating in a communication thread via user devices;
   assimilating, by the server, user information from the group of users relevant to identifying candidate suggestions towards which the decision is to be made;
   using the user information, identifying relevant data of the candidate suggestions for the server to facilitate the decision making process among the group of users;
   presenting the candidate suggestions to the group of users to advance the decision making process among the group of users; and
   when the users of the group are unable to make a decision from among the candidate suggestions, making by the server the decision on behalf of the group of users by selecting one of the candidate suggestions.

2. The method of claim 1, further comprising randomly selecting one of the candidate suggestions.

3. The method of claim 1, further comprising:
   providing a facility for one or more users of the group of users to participate in a game to select the suggestion from the set of suggestions.

4. A computer-readable storage medium that is not a carrier wave containing computer-executable instructions for controlling a computing system to facilitate a decision making process among a group of users, the computer-executable instructions including:
   instructions that receive from a user a request to facilitate a group of users in deciding an activity to engage in, the group of users currently participating in a communication thread via their computing devices;
   instructions that receive, from one or more users of the group via sidebar communications to the communication thread, criteria for the activity, the criteria specifying preferences and limitations relating to the activity;
   instructions that retrieve additional criteria for the activity, the additional criteria previously received from a user of the group prior to being requested to facilitate the group of users in deciding the activity to engage in;
   instructions that search for candidate activities that satisfy the criteria for the activity;
   instructions that present the candidate activities to the users of the group as suggestions for the activity to engage in;
   instructions that, when the users are unable to reach a decision based on the candidate activities, refine the candidate activities by collecting additional criteria for the activity, searching for refined candidate activities based on the criteria for the activity, and presenting the candidate activities to the users of the group.

5. The computer-readable storage medium of claim 4 including instructions that receive an indication of a decision of an activity to engage in and broadcast that decision to the users of the group.

6. The computer-readable storage medium of claim 4 including instructions that make a decision of an activity to engage in on behalf of the group and broadcasts that decision to the users of the group.

7. The computer-readable storage medium of claim 6 wherein the decision is made by randomly selecting one of the candidate activities.

8. The computer-readable storage medium of claim 4 wherein the criteria includes one or more of a time frame, a start time, a start location, an end time, and end location.

9. The computer-readable storage medium of claim 4 wherein the instructions that search for candidates activities access a database of business listings.

10. The computer-readable storage medium of claim 9 wherein the database includes static and dynamic content for the business listings.

11. The computer-readable storage medium of claim 9 wherein the instructions that search for candidate activities collect information in real-time from a business.

12. A computing system for facilitating a decision making process among a group of users, the computing system comprising:
a memory storing computer-executable instructions that:
receive from a user a request to facilitate a group of users in deciding an activity to engage in, the group of users currently engaged in a communication thread via their computing devices;
receive from one or more users of the group criteria for the activity;
search for candidate activities that satisfy the criteria for the activity;
present the candidate activities to the users of the group as suggestions for the activity to engage in;
receive an indication that the users are unable to reach a decision on which candidate activity to engage in; and
when the users are unable to reach a decision on which candidate activity to engage in, make a decision of an activity to engage in on behalf of the group by selecting one of the candidate activities for the group to engage in; and
a processor that executes the computer-executable instructions stored in the memory.

13. The computing system of claim 12 wherein the memory stores instructions that, before making a decision of an activity to engage in on behalf of the group, refine the candidate activities by collecting additional criteria for the activity, searching for refined candidate activities based on the criteria for the activity, and presenting the candidate activities to the users of the group.

14. The computing system of claim 12 wherein the memory stores instructions that retrieve additional criteria for the activity, the additional criteria previously received from a user of the group prior to being requested to facilitate the group of users in deciding the activity to engage in.

15. The computing system of claim 12 wherein the decision is made on behalf of the group by randomly selecting one of the candidate activities.

16. The computing system of claim 12 wherein the instructions that search for candidates activities access a database of business listings.

17. The computing system of claim 16 wherein the database includes static and dynamic content for the business listings.

18. The computing system of claim 16 wherein instructions that search for candidate activities collect information in real-time from a business.

19. The computing system of claim 12 wherein the criteria is received from a user via a sidebar communication to the communication thread.

* * * * *